US010883615B2

(12) United States Patent
Goto et al.

(10) Patent No.: US 10,883,615 B2
(45) Date of Patent: Jan. 5, 2021

(54) METAL DIAPHRAGM VALVE

(71) Applicant: Kitz SCT Corporation, Tokyo (JP)

(72) Inventors: Akira Goto, Tokyo (JP); Hisanobu Iizuka, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 15/938,414

(22) Filed: Mar. 28, 2018

(65) Prior Publication Data

US 2018/0283563 A1 Oct. 4, 2018

(30) Foreign Application Priority Data

Mar. 30, 2017 (JP) .................................. 2017-67325

(51) Int. Cl.
*F16K 7/17* (2006.01)
*F16K 31/122* (2006.01)
*F16K 1/52* (2006.01)

(52) U.S. Cl.
CPC ................ *F16K 7/17* (2013.01); *F16K 1/523* (2013.01); *F16K 31/1221* (2013.01); *F16K 31/1225* (2013.01); *F16K 31/1226* (2013.01)

(58) Field of Classification Search
CPC .... F16K 7/17; F16K 31/1225; F16K 31/1226; F16K 31/1221; F16K 1/523; F16K 47/08; F16K 27/0236
See application file for complete search history.

(56) References Cited

U.S. PATENT DOCUMENTS

| 6,779,774 | B2 * | 8/2004 | Itoi ........................ F16K 1/42 |
| | | | 251/63.6 |
| 8,256,744 | B2 * | 9/2012 | Tanikawa .................. F16J 3/02 |
| | | | 251/331 |
| 10,125,876 | B2 * | 11/2018 | Watanabe ................ F16K 7/17 |
| 10,132,415 | B2 * | 11/2018 | Tanikawa ............. F16K 31/122 |
| 2006/0191777 | A1 * | 8/2006 | Glime ..................... F16K 1/523 |
| | | | 200/81 R |

(Continued)

FOREIGN PATENT DOCUMENTS

| JP | 2000-75931 | 3/2000 |
| JP | 3522544 | 4/2004 |

(Continued)

*Primary Examiner* — Umashankar Venkatesan
*Assistant Examiner* — Andrew J Rost
(74) *Attorney, Agent, or Firm* — Wenderoth, Lind & Ponack, L.L.P.

(57) ABSTRACT

A metal diaphragm valve includes a body with a valve seat provided to a valve chamber communicating a primary flow path and a secondary flow path, a metal diaphragm having a center portion disposed above the valve chamber, the center portion vertically moving to make contact with the valve seat, and a stem provided above the metal diaphragm so as to be able to freely ascend and descend to cause the center portion of the metal diaphragm to move downward. A flow-path restriction part is provided to a part of the secondary flow path. The metal diaphragm valve is quite suitable as a valve for ALD process, the valve favorably reduces fluctuations of a Cv value due to deformation of a resin-made valve seat with time even after the valve is opened and closed at a level of ten million times while a fluid at high temperatures is flowing.

2 Claims, 7 Drawing Sheets

(56) References Cited

U.S. PATENT DOCUMENTS

| | | | |
|---|---|---|---|
| 2013/0181148 A1* | 7/2013 | Tokuda | F16K 31/1225 251/63.6 |
| 2019/0128433 A1 | 5/2019 | Aoyama | |

FOREIGN PATENT DOCUMENTS

| | | |
|---|---|---|
| JP | 3734394 | 1/2006 |
| JP | 5243513 | 7/2013 |
| JP | 5249310 | 7/2013 |
| JP | 5331180 | 10/2013 |
| JP | 5546018 | 7/2014 |
| JP | 2015-52389 | 3/2015 |
| JP | 2015-170185 | 9/2015 |
| JP | 5902063 | 4/2016 |
| JP | 2017-223318 | 12/2017 |
| WO | 01/94824 | 12/2001 |

* cited by examiner

METAL DIAPHRAGM VALVE

BACKGROUND OF THE INVENTION

Field of the Invention

The present invention relates to metal diaphragm valves and, in particular, to a metal diaphragm valve quite suitable as a valve for high-purity gas control for use in ALD (Atomic Layer Deposition).

Description of the Related Art

As a conventional valve for use in a gas supply system for semiconductor manufacturing process, a direct-touch metal diaphragm valve has been in mainstream, exerting excellent characteristics such as dry down characteristics, gas flushing characteristics, and particle-free. This valve has a basic structure as follows. A disc-shaped metal thin film (metal diaphragm) with high strength, high elasticity, and high corrosion resistance serves as a valve body. With its outer periphery interposed between a body and a bonnet, an outer seal portion of a valve chamber is configured. A center portion of the valve body is pressed by an ascending/descending stem to make contact with and fix to a valve seat in a resin-made ring shape affixed to the outer edge of an opening of a flow path to close the valve. On the other hand, when pressure by the stem is released, the center portion is separated with its shape recovery force from the valve seat to open the valve. Also, this valve is often configured to include a stem stroke adjusting means formed of an adjustment screw or the like. This stroke adjusting means adjusts the stroke in accordance with the use position, condition, individual difference, and so forth of the valve to allow a Cv value required for each valve to be taken.

On the other hand, with requests in recent years for further microfabrication, higher integration, and thin-film vapor deposition control at an angstrom level for semiconductors, demands for so-called ALD process as thin-film growth process have been increasing. In ALD process, however, thin-film growth is controlled by laminating layers one by one at an atomic/nanoscale level, and it is thus required in a gas supply line to successively repeat a cycle of very quickly switching different fluids such as a precursor, inert gas, and oxidizing-species gas for supply and discharge to a chamber. Since thin-film growth is controlled at an atomic layer level, the valve open/close life is required to be normally at a level of ten million times in order to achieve thin-film growth on a wafer at a product requirement level. This also requires the valve to have high durability to withstand the number of times of use at a level far exceeding a conventionally-assumed level and also have quick responsiveness in valve opening and closing. Furthermore, for controlling thin-film growth with very high accuracy, the flow rate (Cv value) of the fluid has to be stabilized with very high accuracy while the valve opens and closes in response to this quick pulse of the fluid. Still further, the gas to be supplied is a special fluid made of a metal compound with very low vapor pressures and is thus required to be kept at a temperature of approximately 200 degrees Celsius for stable supply, thereby requiring the valve to have resistance to high temperatures at this level.

With the conditions as described above being required, various problems arise if a conventionally-structured valve is applied to ALD process. Above all, resin-made valve seats conventionally have some problems based on changes with time because the valve is opened and closed a quite large number of times at high speeds as being exposed to the fluid at high temperatures. To solve these problems of the valve seats, Japanese Patent No. 5331180 and Japanese Patent No. 5243513 have been suggested, for example.

Japanese Patent No. 5331180 discloses a valve stroke adjusting method for a direct-touch metal diaphragm valve. In the means described in this patent gazette, the valve is first opened and closed a predetermined number of times under a predetermined temperature to settle a change in shape of the valve seat to reduce an increase of the Cv value. Then, by using a valve stroke adjustment mechanism formed of a bonnet, an actuator-support barrel portion, and a locknut, the maximum valve stroke of the diaphragm valve is adjusted and fixed to a set value smaller than a maximum expansion height of a metal diaphragm configured of a predetermined material in a predetermined shape, thereby achieving high durability of the metal diaphragm, reducing a change of the valve seat with time, and stabilizing the Cv value of the valve.

Japanese Patent No. 5243513 discloses a valve structure of a fluid control valve. The fluid control valve of this patent gazette has a valve seat member made of a fluorine-based resin and formed so that the material thickness in a height direction and the material thickness in a radial direction are at a ratio within a predetermined range. This shape reduces thermal expansion of the valve seat member while the fluid at high temperatures flows and also reduces the sinking amount and the recovery amount with valve opening and closing, thereby reducing fluctuations of the Cv value.

In addition, a conventional gas supply system for semiconductor manufacturing process is provided with a so-called mass flow controller as a means for reducing fluctuations of the Cv value, that is, controlling and stabilizing the flow rate of the fluid. The mass flow controller has a basic structure as follows. While a flow rate control valve such as a direct-touch metal diaphragm valve is provided as a control valve at an appropriate position on a flow path, a flow path into the device is branched into a flow rate sensor side and a bypass side. On the flow rate sensor side, the mass flow rate of the fluid is accurately measured. This measurement information is sent as a flow rate output signal via a control circuit, a valve drive circuit, and so forth to an actuator included in the control valve as necessary information about the degree of opening. The actuator is configured so as to be able to adjust the degree of opening of the valve based on this input information. With transmission of this information always being performed appropriately, the degree of opening of the valve is appropriately adjusted in accordance with the increase and decrease of the flow rate, thereby allowing the flow rate of the fluid flowing through the flow path to be made always constant. For example, in the case of the mass flow controller suggested in Japanese Patent No. 3522544, as a required condition presumed for flow rate control, the upstream pressure of a greatly-narrowed orifice is set so as to be twice the downstream pressure or larger, thereby achieving highly-accurate linearity (proportional relation) between the flow rate of air passing though this orifice and the upstream pressure. FIG. 6 in Japanese Patent No. 3522544 depicts the structure of a replaceable orifice and a control valve.

BRIEF SUMMARY OF THE INVENTION

However, as a result of diligent studies by the inventors of the present application, it has been found that the direct-touch metal diaphragm valve assumed to be used in ALD process as described above has the following new problem.

That is, while a fluid at high temperatures is flowing and the open/close cycle of the valve is repeated on the order of ten million times, the valve seat is gradually deformed as being crushed, although by a very small amount of displacement. With this crushing deformation, the cross-sectional area of the flow path slightly increases, resulting in an increase of the Cv value of the valve beyond the required level. Conventionally, this increase of the Cv value with crushing deformation of the valve seat is very subtle, and the open/close count of the value is several millions at best, and no problem thus arises. However, for the valve for ALD process which very strictly requires stability of the Cv value with high accuracy even under severe circumstances of use at high temperatures with a large number of cycles as described above, the above-described problem is to be newly addressed.

As for the above-described problem, Japanese Patent No. 5331180 states that a change in shape of the valve seat is settled in advance by predetermined valve opening and closing, but does not state or consider a change in shape of the valve seat after the valve is opened and closed at a level of ten million times. Thus, the problem of crushing deformation of the valve seat as described above is unsolvable. Moreover, even if the shape of the valve seat is settled by the means as described in Japanese Patent No. 5331180, it cannot be guaranteed that the valve seat is not crushed and deformed as described above after the use at a level of ten million times. Moreover, in the valve seat settling process described in this patent gazette, while a fluid at a high temperature of 200 degrees Celsius is flowing through each valve, the valve is opened and closed on the order of ten thousand times. This process requires a very large amount of time and effort in practice and is thus not practical. Moreover, an adverse effect on valve productivity is quite large.

Furthermore, in this patent gazette, the valve stroke adjustment mechanism adjusts and fixes the stroke so that the stroke is smaller than the height of expansion of the metal diaphragm to stabilize the Cv value together with an improvement in strength of the diaphragm. In stroke adjustment by the screwing amount between members such as the body, bonnet, and/or locknut, variations and so forth in accordance with machining accuracy of screw threads and screw grooves and an individual difference of the valve are theoretically unavoidable. Thus, while adjustment of the Cv value at a rough level can be easily made, it has to be said that the mechanism is a means not sufficient or stable at all to address very high stabilization of the Cv value required in ALD process as described above. Similarly, the stroke adjustment mechanism as conventionally provided to the valve is only to roughly obtain the required Cv value, and it would be impossible to adjust the Cv value with high accuracy required in ALD process only by that means. Thus, the technique disclosed in this patent gazette cannot solve the above problem.

Also, Japanese Patent No. 5243513 does not describe or suggest a change in shape of the valve seat member after the valve is opened and closed on the order of ten million times. Moreover, the valve seat member of this patent gazette still changes in shape by thermal expansion and sinking/recovery, and no description or consideration is provided at all as to a means to solve fluctuations of the Cv value in accordance with this change in shape. Furthermore, the fluctuations of the Cv value in accordance with the above-described change in shape are within a relatively large numerical value range of 0.2. In a disclosed example of the numerical value, the Cv value at the start of use is decreased by nearly 30% after a predetermined time elapses. In this regard, under a use condition in which fluctuation stability of the Cv value is particularly strict, if a change rate between Cv values before the start of use and after opening and closing ten million times is within 10%, for example, this situation may not be sufficiently addressed. Thus, even the technique of this patent gazette is insufficient yet as a means to solve the above-described problem.

Also, in the direct-touch metal diaphragm valve, a gap between the diaphragm and the valve seat structurally has a direct influence on the Cv value of the valve. Also stability of the Cv value in ALD process requires very high accuracy. Therefore, as described in Japanese Patent Nos. 5331180 and 5243513, it has to be said that merely a contrivance or improvement regarding a flexible soft member such as a resin-made valve seat or a metal diaphragm fundamentally cannot provide a means which sufficiently solves the above-described problem.

On the other hand, Japanese Patent No. 3522544 discloses a direct-touch metal diaphragm valve as a control valve, but does not describe or suggest a resin-made valve seat at all, and does not describe the above-described problem and ALD process at all, either, merely disclosing a technique regarding a mass flow controller. Thus, it is impossible to solve the above-described problem based on this patent gazette. Also, the mass flow controller as described above basically has a usable gaseous species defined individually and also has a complex, expensive structure, and thus can be said to have a large problem at least in productivity, usability, and so forth.

Thus, the present invention has been developed to solve the above-described problem. An object of the present invention is to provide a direct-touch metal diaphragm valve quite suitable as a valve for ALD process, the valve in merely a simple structure favorably reducing fluctuations of a Cv value due to deformation of a resin-made valve seat with time even after the valve is opened and closed at a level of ten million times while a fluid at high temperatures is flowing, and the valve also having high durability.

To achieve the above object, one aspect of the present invention is directed to a metal diaphragm valve valve including a body with a valve seat provided to a valve chamber communicating a primary flow path and a secondary flow path, a metal diaphragm having a center portion disposed above the valve chamber, the center portion vertically moving to make contact with the valve seat, and a stem provided above the metal diaphragm so as to be able to freely ascend and descend to cause the center portion of the metal diaphragm to move downward, and a flow-path restriction part being provided to a part of the secondary flow path.

Another aspect of the present invention is directed to the metal diaphragm valve further including Cv value adjusting means which can make adjustment to a Cv value required for the valve.

A still another aspect of the present invention is directed to the metal diaphragm valve in which the Cv value adjustment in the Cv value adjusting means is performed by adjusting a degree of valve opening of the metal diaphragm.

A yet another aspect of the present invention is directed to the metal diaphragm valve in which the Cv value adjusting means is stroke adjusting means which performs adjustment of a stroke of the metal diaphragm.

A yet another aspect of the present invention is directed to the metal diaphragm valve in which an actuator is mounted on the body, the actuator having incorporated therein a spring which causes the stem to descend and a piston which is caused to ascend by supply of compressed air, and an ascending amount of the piston is adjustable by screwing an adjustment screw, thereby providing the stroke adjustment means.

A yet another aspect of the present invention is directed to the metal diaphragm valve in which the flow-path restriction part is provided at a communication position between the secondary flow path and an exit flow path provided to the body.

A yet another aspect of the present invention is directed to the metal diaphragm valve in which the flow-path restriction part is provided so that fluctuations of the Cv value between a start of use of the valve and after opening and closing ten million times while a fluid at high temperatures is flowing is 10% or less.

A yet another aspect of the present invention is directed to a metal diaphragm valve in which the flow-path restriction part has a restriction rate of a flow path diameter with respect to the secondary flow path in a range equal to or larger than 0.58 and smaller than 1.

According to one aspect of the present invention, the flow-path restriction part is provided to a part of the secondary flow path. Thus, for example, as is the case of being used for ALD process, when the valve seat is deformed as being crushed after the valve is opened and closed at a level of ten million times while the fluid at high temperatures is flowing and the cross-sectional area of the flow path is increased accordingly or, conversely, when the cross-sectional area of the flow path is decreased due to expansion deformation of the valve seat, even if a slight change (subtle increase or subtle decrease) occurs in the flow rate of the fluid flowing from the valve chamber to the secondary flow path, such a slight fluctuation of the flow rate can be favorably absorbed and mitigated at the flow-path restriction part provided to a part of the secondary flow path. As a result, an effect of extremely reducing fluctuations of the Cv value of the valve is brought, compared with an amount corresponding to the change in shape of the valve seat. Also, the flow-path restriction part is a means for stabilizing fluctuations of the Cv value in a simple structure made of a high-stiffness member. Therefore, basically, the flow-path restriction part can perpetually function as a Cv value stabilizing means irrespectively of the number of use of the valve, and can stabilize the Cv value only with the very simple structure.

According to another aspect of the present invention, the Cv value adjusting means which can make adjustment to a Cv value required for the valve is provided. Thus, for example, the Cv value roughly required for the valve can be easily taken in accordance with, for example, the use position and condition of the valve, gaseous species for use, individual difference of the valve, and so forth.

According to still another aspect of the present invention, the Cv value adjustment in the Cv value adjusting means is performed by adjusting a degree of valve opening of the metal diaphragm. Thus, as a principle for adjusting the Cv value, this is the simplest and direct scheme in view of the valve structure. Also, adjustment and setting can be easily made over a wide range, and valve usability can be enhanced.

According to yet another aspect of the present invention, the Cv value adjusting means is stroke adjusting means which performs adjustment of a stroke of the metal diaphragm. Thus, adjustment of the degree of valve opening of the metal diaphragm can be easily and reliably adjusted with a very simple structure.

According to yet another aspect of the present invention, the stroke adjustment means adjusts the ascending amount of the piston incorporated in the actuator mounted on the body with the adjustment screw provided to be adjustable by screwing. Thus, the Cv value can be easily and reliably adjusted only with a very simple structure.

According to yet another aspect of the present invention, the flow-path restriction part is provided at a communication position between the secondary flow path and an exit flow path provided to the body, and thus can be formed in a very simple manner. Also, the flow-path restriction part is formed at a position immediately after the valve chamber, and thus can directly address a slight fluctuation of the flow rate inside the valve chamber where the resin-made valve seat is provided, thereby enhancing the effect of stabilizing the Cv value of the valve. Furthermore, the body can be made compact, which also contributes to a reduction in size of the valve.

According to yet another aspect of the present invention, the flow-path restriction part is provided so that fluctuations of the Cv value between a start of use of the valve and after opening and closing ten million times while a fluid at high temperatures is flowing is 10% or less. With very high stability of the Cv value, the valve can be favorably used as a valve for use in, for example, gas supply in ALD process, under a wide range of conditions.

According to yet another aspect of the present invention, the restriction rate of the flow path diameter with respect to the secondary flow path is in a range equal to or larger than 0.58 and smaller than 1. Thus, while the Cv value required for the valve is reliably ensured, a valve structure can be set as appropriate in accordance with use conditions such as the required stability of the Cv value.

DETAILED DESCRIPTION OF THE INVENTION

Figure 1:
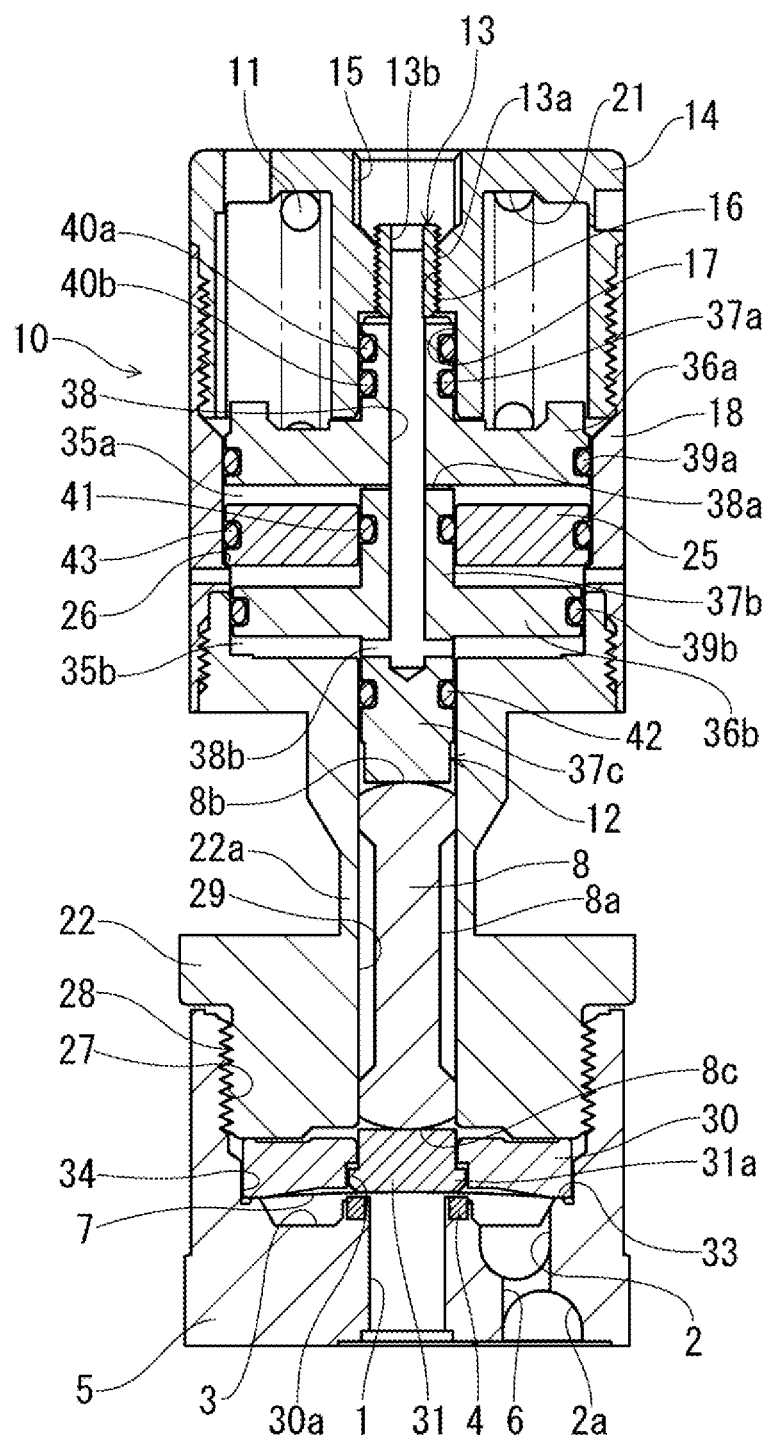
FIG. 1 is a longitudinal sectional view of a metal diaphragm valve of an example in a full-open state.
Figure 2:
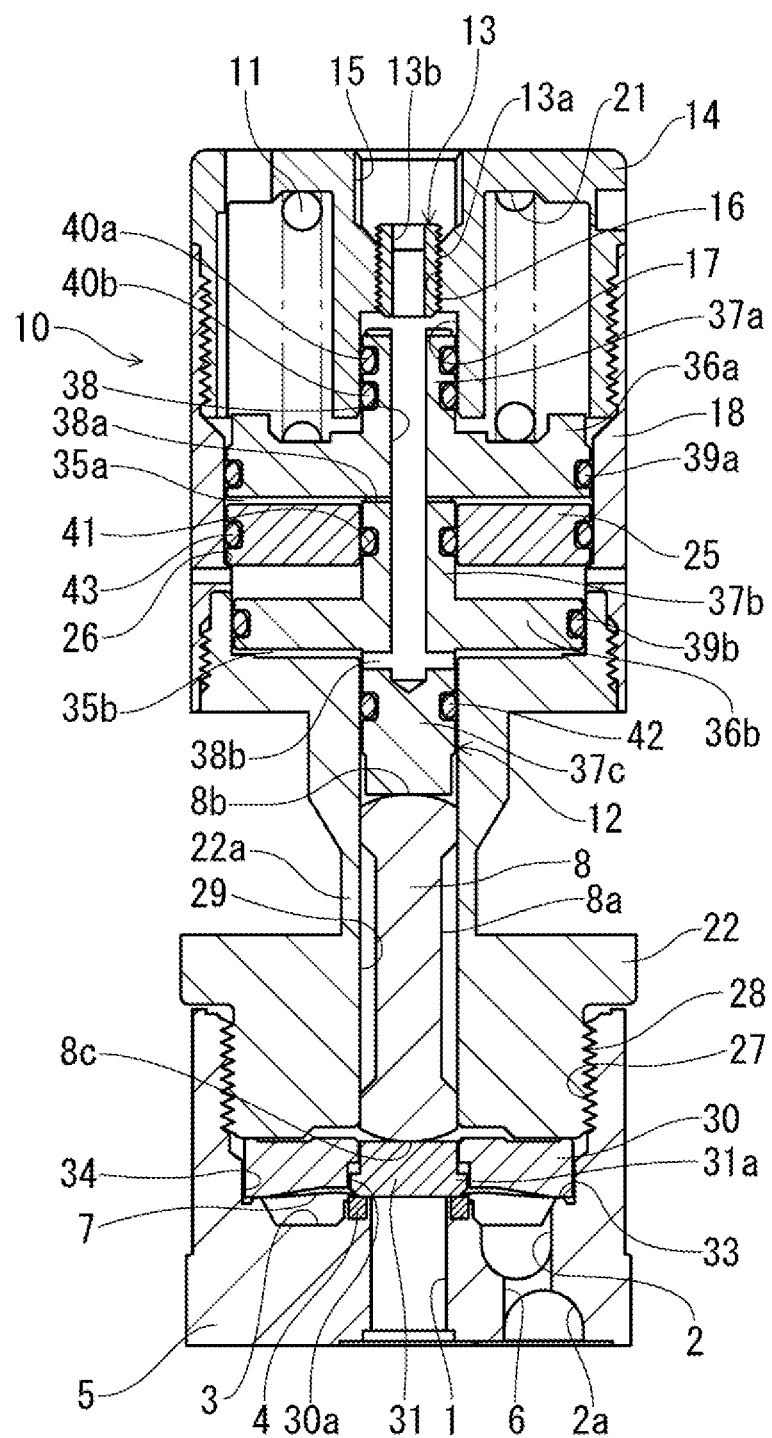
FIG. 2 is a longitudinal sectional view of the metal diaphragm valve of the present example in a full-closed state.

In the following, the structure of an embodiment of the present invention is described in detail based on the drawings. FIG. 1 is a longitudinal sectional view of a metal diaphragm valve including an actuator of the present embodiment (example) in a full-open state. FIG. 2 depicts a full-closed state of FIG. 1.

The valve of the present example is a metal diaphragm valve having a body 5 with a valve seat 4 provided to a valve chamber 3 communicating a primary flow path 1 and a secondary flow path 2, a metal diaphragm 7 having a center portion disposed above the valve chamber 3, the center portion vertically moving to make contact with the valve seat 4, and a stem 8 provided above the metal diaphragm 7 so as to be able to freely ascend and descend to cause the center portion of the metal diaphragm 7 to move downward. A flow-path restriction part 6 is provided to a part of the secondary flow path 2.

On the body 5, an actuator main body 10 is mounted. This actuator main body 10 has incorporated therein a spring 11 which causes the stem 8 to descend and a piston 12 which is caused to ascend by supply of compressed air. The ascending amount of this piston 12 is adjustable by screwing an adjustment screw 13, thereby providing stroke adjusting means.

A cover 14 has a substantially cylindrical outer shape. At its axial center position, a connecting part 15 formed of a female screw which can be connected (screwed) to an air source not depicted and provided outside. On its depth side, a female screw part 16 is formed which can be screwed to the adjustment screw 13 described further below. On its depth side, a fit-in part 17 is formed which can fit in an extended part 37*a* of the piston described further below. At a lower end of the cover 14, a male screw that can be screwed to a female screw of a casing 18 is provided. Also, inside the cover 14, a receiving part 21 for pressing the spring 11 described further below is provided so as to form a recess.

The casing 18 is formed to have a cylindrical outer shape having a diameter substantially equal to the diameter of the cover 14, with the above-described female screw formed at its upper end and a female screw that can be screwed to a male screw of a base 22 also formed at its lower end. Also, on an inner peripheral surface of the casing 18, a step part 26 is formed that can hold and engage a sub-base 25 described further below.

An upper side of the base 22 is formed in a cylindrical shape having a diameter substantially equal to the diameter of the casing 18, and has a male screw that can be screwed to the above female. On the other hand, a lower side of the base 22 is formed in a cylindrical shape substantially identical to the shape of the body 5, and has a male screw 28 that can be screwed to a female screw 27 of the body 5. Also, at the axial center position at the center, a mounting hole 29 formed so as to be vertically elongated is open, where a rod 8 as a stem fits so as to be able to slide vertically. Furthermore, as will be described further below, a neck part 22*a* is formed between an upper side and a lower side as a measure to insulate heat from a fluid at high temperatures.

A bonnet 30 is formed in a substantially flat cylindrical shape. At its axial center position at the center, a mounting hole 30*a* is open, where a diaphragm piece 31 fits so as to be able to slide vertically. This mounting hole 30*a* is provided with a step part corresponding to a flange part 31*a* of the diaphragm piece 31.

The metal diaphragm 7 is formed in a substantially disc shape. In the present example, diaphragm members of a predetermined number of sheets made of SPRON are stacked for use. An outer edge of these members are interposed and fixed between a protrusion 33 formed on the outer periphery of the valve chamber 3 of the body 5 and the outer periphery at the lower end of the bonnet 30 to configure an outer-peripheral seal part of the valve chamber 3.

When the valve of the present example is assembled, the outer edge of the metal diaphragm 7 is put on the protrusion 33, and the outer periphery at the lower end of the bonnet 30 is put on that edge, and they are interposed from above and below. In this state, when the male screw 28 of the base 22 is screwed to the female screw 27 of the body 5, a lower end face side of the base 2 presses and fastens an upper end face side of the bonnet 3. This causes the outer edge of the metal diaphragm 7 to be interposed by the bonnet 30 and the protrusion 33 from above and below and fixed inside the valve chamber 3, thereby configuring the outer-peripheral seal part.

Figure 3:
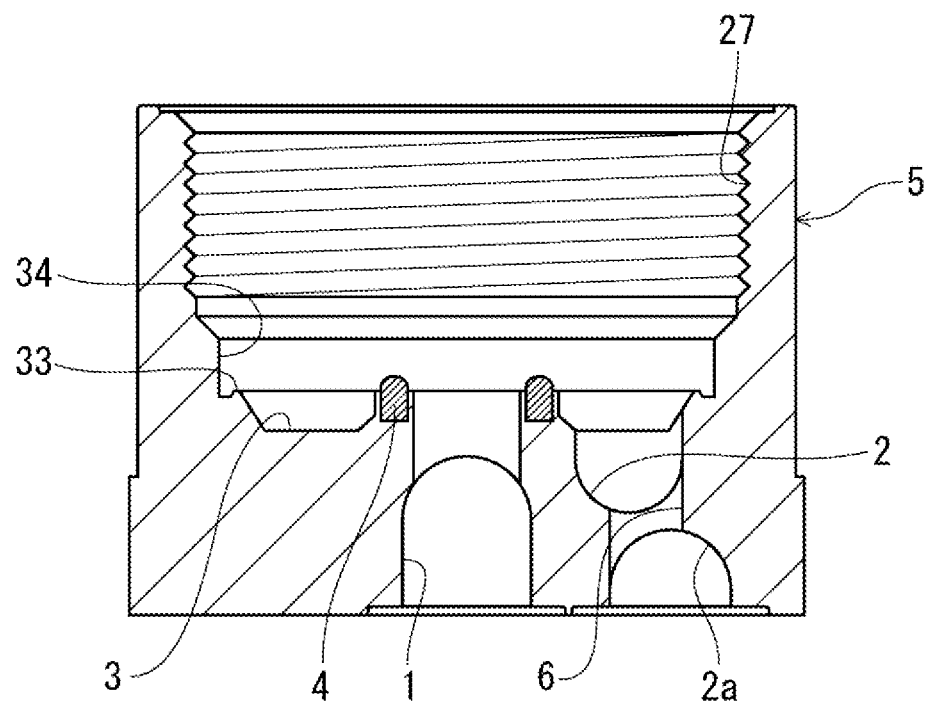
FIG. 3 is a longitudinal sectional view of a body of the present example.
Figure 7:
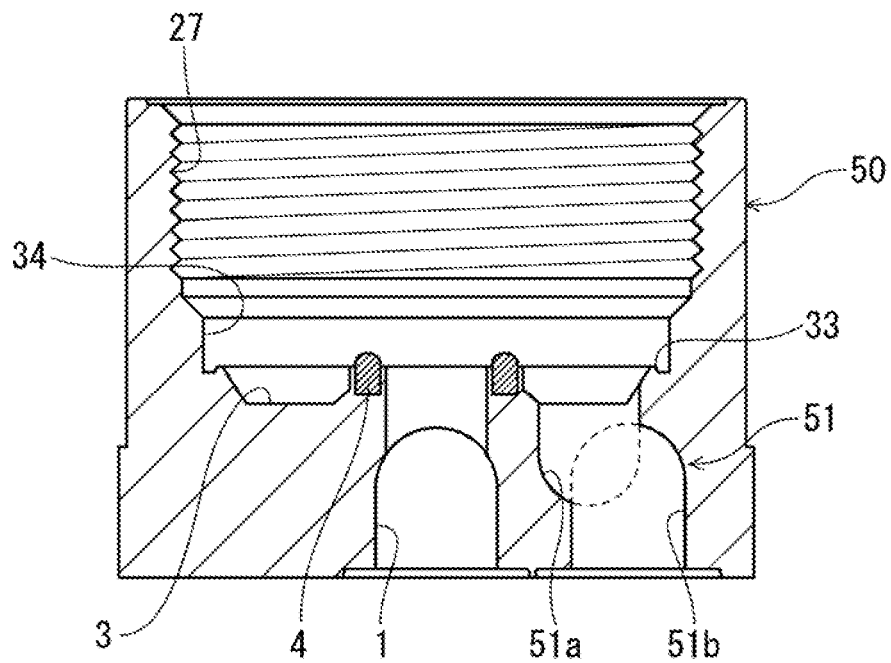
FIG. 7 is a longitudinal sectional view of a body of a conventional example.

FIG. 3 is a longitudinal sectional view of the body 5 of the present example. FIG. 7 is a longitudinal sectional view of a body 50 of a conventional example. The body 5 of the present example is different from the body 50 of the conventional example in that a flow-path restriction part 6 is provided to the secondary flow path 2. The flow-path restriction part 6 of the present example is provided at a communication position between the secondary flow path 2 and an exit flow path 2*a* provided to the body 5.

In FIG. 3, the body 5 of the present example is integrally formed so as to have a substantially rectangular parallelepiped outer shape made of SUS 316 L. On an upper inner peripheral surface of the cylindrical part, the female screw 27 that can be screwed to the male screw 28 of the base 22 is formed. On its side surface on a depth side, a fit-in part 34 that can fit in the outer peripheral surface of the bonnet 30 is formed. On its bottom surface on the depth side, a space of the annular valve chamber 3 is formed. From the bottom surface side of the body 5, the primary flow path 1 is bored upward at the axial center position to be open to the space of the valve chamber 3. To a mounting groove formed on the outer edge of this opening, the ring-shaped valve seat 4 made of PFA is fixed. To an upper surface of the valve seat 4, a lower surface of the center portion of the metal diaphragm 7 is pressed by the rod 8 to be flexibly deformed, and can be closely attached (seated) thereonto.

In FIG. 3, the secondary flow path 2 communicates from a part of the bottom surface of the valve chamber 3 toward the bottom surface side of the body 5, and is partially provided with the flow-path restriction part 6. In an example of a method of machining this flow-path restriction part 6, the secondary flow path 2 is bored from a valve chamber 3 side to a predetermined depth in the axial center direction of the body 5. On the other hand, the exit flow path 2*a*, which is a part of the secondary flow path 2, is bored from the bottom surface side of the body 5 to a predetermined depth to a direction slightly eccentric from the axial center direction of this secondary flow path 2. Here, machining is performed to each depth so that the secondary flow path 2 and the exit flow path 2*a* do not communicate each other. Next, the flow-path restriction part 6 having a predetermined diameter is bored so that these secondary flow path 2 and exit flow path 2*a* communicate each other. This allows the secondary flow path 2 having the flow-path restriction part 6 in the present example to be easily formed. In this manner, the secondary flow path 2 is shallowly connected directly from the valve chamber 3, the short flow-path restriction part 6 is connected immediately thereafter, the diameter-enlarged exit flow path 2*a* is connected immediately thereafter, and then all of these are formed in the compactly-formed body 5. This minimizes the distance between the valve chamber 3 and the flow-path restriction part 6, and also enhances an effect of reducing the change rate of the Cv value of the valve by the flow-path restriction part 6.

By contrast, FIG. 7 is a longitudinal sectional view of an example of the structure of a secondary flow path 51 of the conventional body 50. As depicted in FIG. 7, in this conventional example, the secondary flow path 51 is formed of two flow paths, that is, an inflow flow path 51*a* and an outflow flow path 51*b*. The inflow flow path 51*a* and the outflow flow path 51*b* bored so as to directly cross to communicate each other, and the flow-path restriction part 6 as depicted in FIG. 3 is not provided. In FIG. 7, a portion identical to that in FIG. 3 is provided with the same reference character and is not described herein.

Next, the structure of the actuator main body 10 of the present example is described by using FIG. 1 and FIG. 2. The actuator main body 10 is provided with at least two air chambers 35a and 35b to ensure an air drive force (valve-opening force). As depicted in FIG. 1 and FIG. 2, the sub-base 25 is arranged, and the piston 12 is made compact in a two-step structure, thereby ensuring the air chambers 35a and 35b.

The piston 12 has two circular-flange-shaped piston parts 36a and 36b projecting in parallel and cylindrical extended parts 37a, 37b, and 37c linking the center positions of these piston parts. On an upper end face side of the extended part 37a, a flow path 38 though which supplied air can be passed is open to the axial center direction inside the piston 12. In this flow path 38, flow paths 38a and 38b which are open toward the two air chambers 35a and 35b to be able to supply air are formed as being branched. Thus, when an air supply source not depicted is connected to the connecting part 15, the air from the supply source passes through the flow paths 38, 38a, and 38b to be supplied to the air chambers 35a and 35b.

On outer edges of the piston parts 36a and 36b, O rings 39a and 39b made of FKM are provided, each sliding and sealing between the casing 18 and the inner peripheral surface of the base 22. Similarly, the extended part 37a is provided with O rings 40a and 40b, the extended part 37b is provided with an O ring 41, the extended part 37c is provided with an O ring 42 and, furthermore, the outer edge of the sub-base 25 is provided with an O ring 43. When the piston 12 ascends and descends as described further below, the cylindrical extended part 37a may move upward and downward as being slightly tilted with respect to the axial center direction of the cover 14 (fit-in part 17) to slide over the inner peripheral surface of the fit-in part 17 to cause damage or actuation failure. To prevent this problem, the two O rings 40a and 40b are provided, thereby enhancing an effect of reducing the tilt of the piston 12.

The rod 8 as a stem is provided so as to fit in the inner peripheral surface of the mounting hole 29 of the base 22 to be vertically slidable almost without resistance, and is formed so as to be longitudinally elongated and made of SUS 304, with an upper end face 8b making contact with the lower end face of the extended part 37c of the piston 12 and a lower end face 8c making contact with an upper end face of the diaphragm piece 31.

Also, when the fluid is at high temperature such as approximately 200 degrees Celsius, heat is transferred to increase the temperatures of the actuator, thereby causing actuation failure. If an electronic device such as a sensor is attached, heat may damage the device and/or cause trouble. Thus, to make it difficult to transfer heat from the heated body 5 and so forth to the actuator main body 10, a predetermined measure against heat is provided. In this example, the cross-sectional area of a heat conductive route member through which heat is transferred from the body 5, the bonnet 30, and so forth as heat generation members to the actuator main body 10 is decreased in a range not causing trouble in the functions of the valve and the actuator.

Specifically, to decrease a contact region in contact with an upper end face of the diaphragm piece 31, which can be a heating member due to heat conduction from the fluid at high temperatures, the lower end face 8c of the rod 8 is formed in an arc-shaped curved surface. Similarly, the upper end face 8b of the rod 8 is also formed in an arc-shaped curved surface to decrease a contact region in contact with a lower end face of the extended part 37c of the piston 12. Above and below the rod 8, at least efficient heat conduction due to a surface contact is eliminated. Furthermore, the base 22 is provided with the neck part 22a, and the rod 8 is provided also with a neck part 8a. This decreases the cross-sectional area of heat conduction from the body 5 side to the actuator main body 10 side as much as possible to reduce thermoelectric power.

The metal diaphragm valve of the present invention includes a Cv value adjusting means which can make adjustment to a Cv value required for the valve. This is because the valve is manufactured so that a Cv value with a larger margin can be set compared with a Cv value that can be required for the same product and then adjustment is made so as to set a Cv value actually required for each valve to eliminate an individual difference. Also, in addition to the individual difference among the same products, use conditions and so forth may be different among valves. By providing the Cv value adjusting means, adjustment can be made in advance so as to set a unique Cv value required for each valve. Thus, any means that can adjust the valve to set a required Cv value can be selected in accordance with implementation. For example, the Cv value may be adjusted by replacing the diaphragm to change the Cv value or replacing the body, the valve seat, and/or the bonnet to change the valve chamber capacity, the flow path shape, and so forth.

In the present example, the Cv value adjustment as described above is performed by adjusting the degree of valve opening of the metal diaphragm 7. This is quite favorable because the degree of valve opening directly influences the Cv value and also adjustment of the degree of valve opening can be said as the simplest, most reliable Cv value adjusting means. Furthermore, as described above, the Cv value adjusting means is the stroke adjusting means for adjusting the stroke of the metal diaphragm 7 in the present example. The adjustment screw 13 serves as this stroke adjusting means, which is provided so as to be able to make height adjustment, with a male screw part 13a screwed to the female screw part 16 of the cover 14, as depicted in FIG. 1 and FIG. 2.

Specifically, in the valve of the present example, a fluid at high temperatures of approximately 200 degrees Celsius is assumed as a fluid for use, and the Cv value of the valve at 200 degrees Celsius is required to be 0.5. To address this, the valve is designed in advance so that the Cv value can take a value on the order of 0.65 at ordinary temperatures and can take a value of, for example, 0.6 (a value larger than at least 0.5) at 200 degrees Celsius in a full-open state of the metal diaphragm 7, and then adjustment is made by the adjustment screw 13 so that the Cv value is reduced to 0.5, thereby eliminating an individual difference (Cv value difference) of the valve at 200 degrees Celsius.

With the male screw part 13a screwed and fastened to the female screw part 16, the adjustment screw 13 can adjust a screwing distance of this screw fastening. This screw fastening can be made by inserting a wrench into a hole part 13b for rotation. Also, an upper end of the extended part 37a of the piston 12 ascends by air supply to make contact with a lower end of the adjustment screw 13 to regulate ascension. Thus, by adjusting screw fastening to set the position of the adjustment screw 13 at a maximum stroke position of the piston 12 in accordance with the Cv value required for the valve, ascension of the piston 12 is regulated to allow adjustment of the Cv value of the valve. When a supply source is attached to the connecting part 15 for air supply to the actuator, the supplied air can communicate a flow path formed by passing through the axial center position of this adjustment screw 13.

Next, the operation of the valve in the present example from a full-open state to a full-closed state is described. As described above, FIG. 1 depicts a full-open state, and FIG. 2 depicts a full-closed state. In the following, the case is described in which air is exhausted from the air chambers 35a and 35b in a full-open state.

In FIG. 1, the air chambers 35a and 35b are filled with air. The pressure of this air pulls up the piston parts 36a and 36b against the pressing force of the spring 11. On the other hand, the center portion of the metal diaphragm 7 swells upward by a self shape recovery force. In this swelling state, the diaphragm piece 31 mounted on the upper surface is lifted together with the rod 8 mounted thereon. Also, as described above, the upper end of the extended part 37a of the piston 12 makes contact with the lower end of the adjustment screw 13 by its stroke adjustment, thereby regulating ascension of the upper end of the extended part 37a. Thus, the center portion of the metal diaphragm 7 does not completely swell to a natural shape but is slightly recessed.

Next, as air is exhausted from the air chambers 35a and 35b, the upper surface of the piston part 36a is pressed downward by the pressing force of the spring 11. Accordingly, the lower end of the extended part 37c of the piston 12 presses down the upper end face 8b of the rod 8. Accordingly, the lower end face 8c of the rod 8 presses down the upper end face of the diaphragm piece 31. Accordingly, a lower surface of the diaphragm piece 31 flexibly deforms the metal diaphragm 7 so that its upper surface of the center portion is recessed. Then, when the diaphragm piece 31 completely descends to cause the center portion of the metal diaphragm 7 to closely make contact with the upper surface of the valve seat 4, the valve becomes in a full-closed state, as depicted in FIG. 2.

Operation from a full-closed state to a full-open state is in reverse to the above-described operation. First, air is supplied from the air supply source, not depicted, connected to the connecting part 15 via the flow paths 38, 38a, and 38b to the air chambers 35a and 35b to provide air pressure to the actuator main body 10. This air pressure causes the piston 12 to ascend. With this ascension of the piston 12, the rod 8 and the diaphragm piece 31 are released from being pressed by the piston 12. Also, the shape recovery force of the metal diaphragm 7 is released. Accordingly, swelling of the center portion of the metal diaphragm 7 causes the diaphragm piece 31 and the rod 8 to be lifted up to ascend. This ascension ends with the upper end of the extended part 37a of the piston 12 making contact with the lower end of the adjustment screw 13, thereby causing the valve to be in a full-open state depicted in FIG. 1.

EXAMPLE

Figure 4:
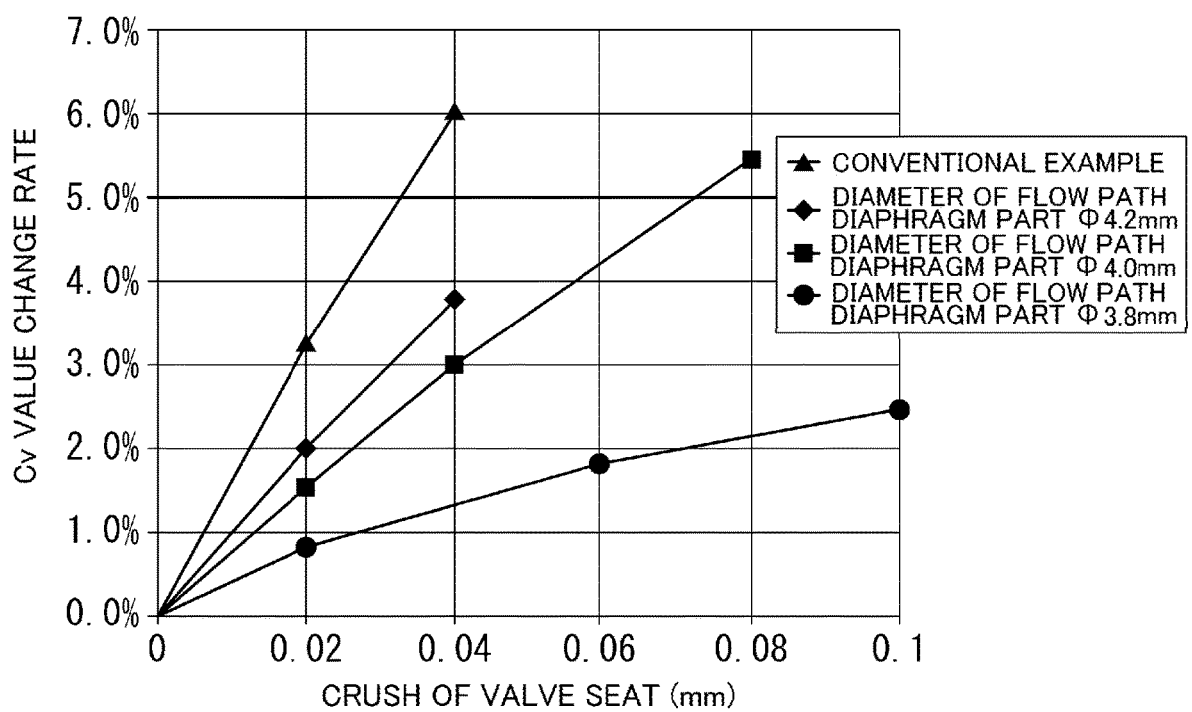
FIG. 4 is a graph plotted with valve seat crushing and Cv value change rate.

Next, the operation and effect of the flow-path restriction part 6 of the present invention are described based on an exemplary experiment using 3D-CAD simulation. FIG. 4 is a graph plotted with the result of the experiment in which, in a metal diaphragm valves each with the body 50 of the present example depicted in FIG. 1 to FIG. 3 and metal diaphragm valve with the conventionally-structured body 50 depicted in FIG. 7 as a comparative example, the diameter of the flow-path restriction part 6 is set at Φ3.8 mm, Φ4.0 mm, and Φ4.2 mm and several crushing amounts from a reference height of the valve seat 4 are set as appropriate to see how the Cv value of each valve changes for each crushing amount. The diameter of the secondary flow path 2 of FIG. 1 to FIG. 3 and the diameter of the inflow flow path 51a are both set at Φ6 mm and the diameter of the exit flow path 2a of FIG. 1 to FIG. 3 and the outflow flow path 51b are both set at Φ7 mm.

As depicted in FIG. 4, in view of the problem of crushing of the valve seat as described above, the inventors of the present application provided the flow-path restriction part 6 to the secondary flow path 2 and measured a change rate (increasing rate) of the Cv value of the valve, finding an effect in which the change rate of the Cv value can be significantly reduced. As depicted in FIG. 4, compared with the conventional structure, it is evident that the gradient of each graph in the present example provided with the flow-path restriction part 6 is small. Furthermore, it has been revealed that as the diameter of the flow-path restriction part 6 is constricted more, the gradient of the graph is smaller, thereby decreasing the influence on the Cv value due to crushing deformation of the valve seat 4. As depicted in FIG. 4, a crushing amount from a reference height of the valve seat is in a range larger than 0 mm and equal to or smaller than 0.1 mm.

The reason for the above can be thought as follows. The Cv value is normally defined as, for example, an amount obtained by converting a flow rate at which water with a pressure difference of 1 psi (approximately 6.9 kPa) at a temperature of 60° F. (approximately 15.5° C.) flows through a specific travel (such as a valve, orifice, or the like in a specific state and with a specific degree of opening) into US gal/min (approximately 3.785 L/min), and is thus calculated from the pressure difference (pressure loss) and the flow rate. In consideration of this, with the provision of pressure loss means such as the flow-path restriction part 6 capable of appropriately increasing a pressure loss of the valve, even if the valve seat 4 is slightly crushed and the flow rate of the inflow from the inside of the valve chamber 3 is slightly increased accordingly, reflection onto the increase of the Cv value is thought to become dull (the gradient of Cv value characteristics of the valve with respect to fluctuations of the flow rate in accordance with crushing deformation of the valve seat 4 becomes mild), compared with the case without the flow-path restriction part 6, at least within a range of this slight increase of the flow rate of the fluid of this type. However, not any pressure loss means can be used, but the pressure loss means is required to be able to appropriately provide a pressure loss to the fluid in accordance with deformation of the valve seat with time, as the flow-path restriction part 6 of the present invention. Thus, in the present invention, with the provision of the flow-path restriction part 6 to a part of the secondary flow path 2, it can be said that at least an increase of the Cv value of the valve in accordance with crushing deformation of the valve seat 3 is reduced.

Thus, with the diameters of the secondary flow path 2 and the exit flow path 2a fixed to the above-described values, the diameter of the flow-path restriction part 6 was changed to change a restriction rate ("diameter of the flow-path restriction part 6/diameter of the secondary flow path 2" in the present embodiment) to find a favorable range. As a result, it has been revealed that a favorable rate of the diameter of the flow-path restriction part 6 with respect to the diameter of the secondary flow path 2 is at least equal to or larger than 0.58 and smaller than 1. That is, if the diameter of the flow-path restriction part 6 is approximately below Φ3.5 mm, the Cv value at 200 degrees Celsius is below 0.5, which would be suitable for a lower limit of the diameter. On the other hand, as for an upper limit of the diameter, in consideration of the requirement that at least a restriction part be formed, the diameter has to be set smaller than either one of the diameter of the secondary flow path 2 and the diameter of the exit flow path 2a. In the present embodiment, since the diameter of Φ6 mm of the secondary flow path 2 is smaller, the rate is set to be smaller than 1 in view of setting at a range smaller than this diameter. Thus, the rate of the diameter of the flow-path restriction part 6 with respect to the secondary flow path 2 is equal to or larger than 0.58 and smaller than 1, and the rate thereof with respect to the exit flow path 2a is equal to or larger than 0.5 and equal to and smaller than 0.86. In this manner, the diameter of the flow-path restriction part 6 can be set as appropriate in accordance with the size, use condition, and so forth of the valve. In the valve of this example, the diameter of the flow-path restriction part 6 is set at Φ4 mm. In this case, the restriction rate is 0.67 with respect to the secondary flow path 2 and 0.57 with respect to the exit flow path 2a.

According to the effect of the flow-path restriction part 6 reducing an increase of the Cv value, conversely speaking, if the valve seat 4 is deformed as slightly expanding to decrease the cross-sectional area of the flow path and also decrease the Cv value of the valve slightly accordingly, there may also be the possibility that this decreasing rate of the Cv value can be reduced compared with the case in which the flow-path restriction part 6 is not provided.

Figure 5:
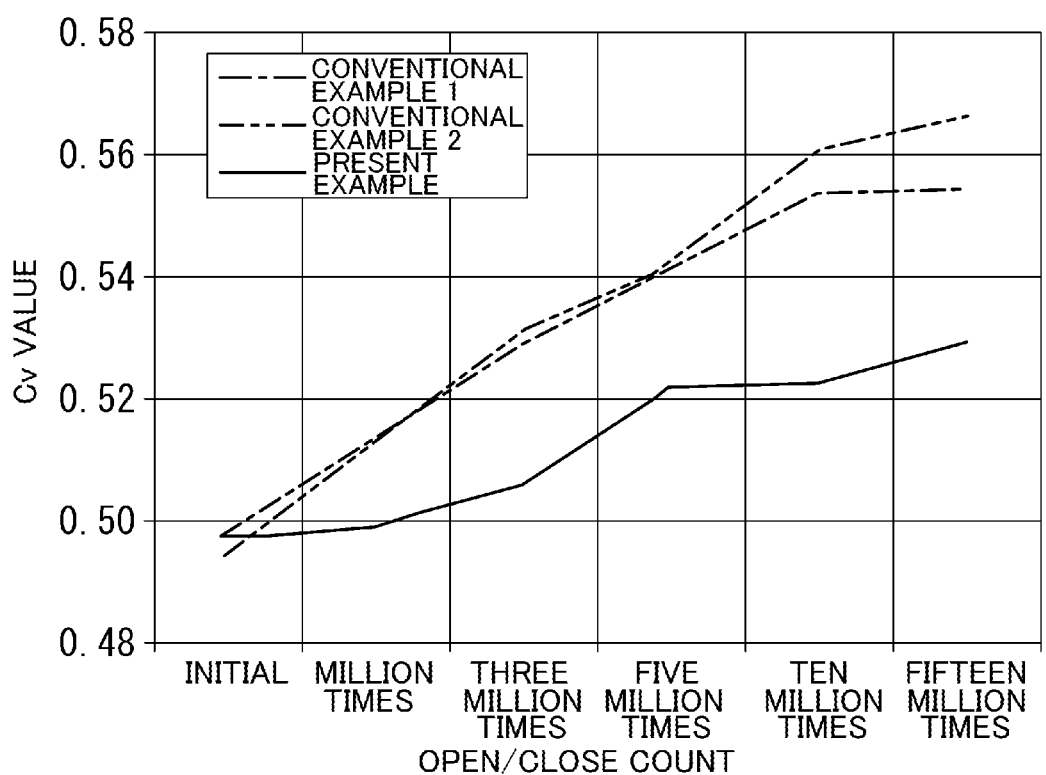
FIG. 5 is a graph plotted with valve open/close count and Cv value.
Figure 6:
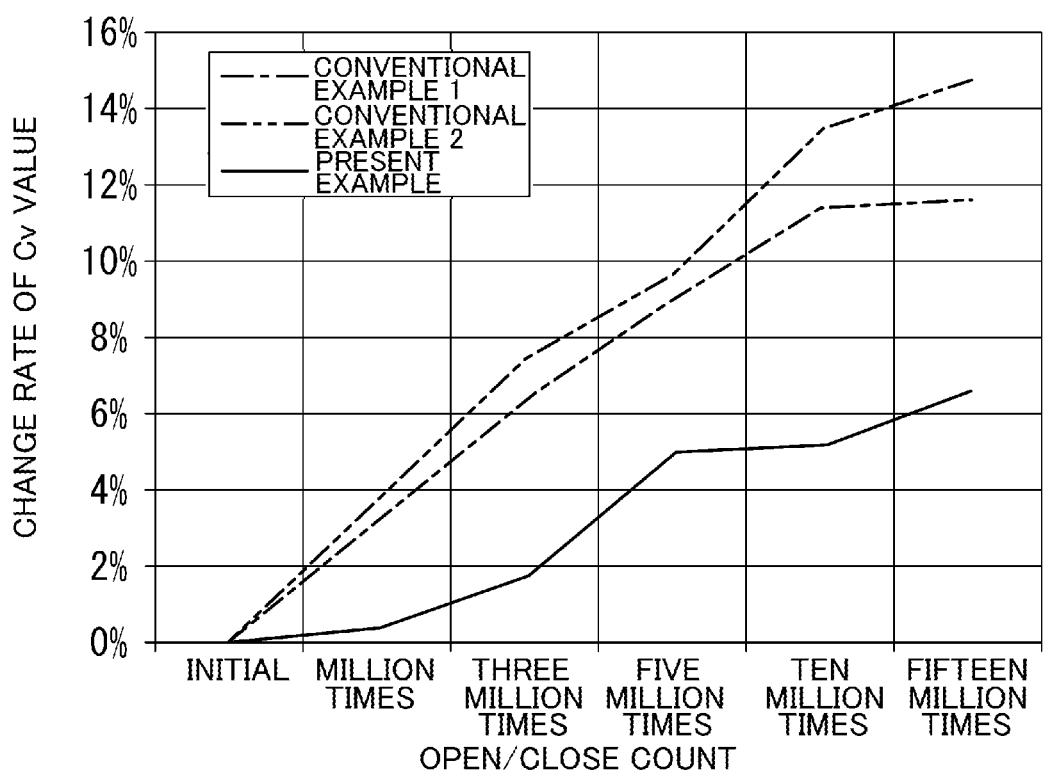
FIG. 6 is a graph plotted with Cv value change rate on the vertical axis in FIG. 5.

By contrast, FIG. 5 and FIG. 6 depict a result of a durability open/close test in which, with a fluid at high temperatures of approximately 200 degrees Celsius actually flowing through a valve of the structure of this example, the valve is used at a level of ten million times. As comparative examples, two conventional examples each with a structure similar to that of the body 50 depicted in FIG. 7 are provided for comparison with the valve of the present example regarding fluctuations of the Cv value. FIG. 5 depicts actual fluctuation values of the Cv value, and FIG. 6 depicts a change rate (increasing rate) of fluctuations with respect to an initial state. In each valve used in the test of the present example, the valve seat 4 is subjected to a predetermined aging process so that a change in shape due to deformation by temperature, external forces, and so forth is settled to some degree, and the valve after this process is taken as being in an initial state (at the start of use before passing a fluid at high temperatures through the valve to perform the open/close test).

As depicted in FIG. 6, while the Cv value in both of the two conventional examples increases by 10% or more with respect to an initial value after opening and closing ten million times, the change rate of the valve of the present example is kept at 5% or so. In regard to the change rate of the Cv value, the structure of the present example having the flow-path restriction part 6 is improved twice as well as the structure of the conventional examples. Furthermore, after opening and closing fifteen million times, the change rate is settled to a degree of not reaching 7%. This level is sufficient for a gas supply valve for ALD process increasingly required in recent years, and can be said as one standard. Thus, in the valve of the present example, by setting fluctuations of the Cv value after opening and closing ten million times at 10% or less with respect to the initial state of the valve (at the start of use), flow rate stability sufficient also for ALD process can be ensured.

Furthermore, the present invention is not limited to the description of the above-described embodiment, and can be variously modified in a range not deviating from the gist of the present invention described in the claims of the present invention.

What is claimed is:

1. A metal diaphragm valve comprising:
   a body having a single primary flow path and a single secondary flow path formed therein;
   an annular valve chamber formed between a ring-shaped valve seat and an outer-peripheral seal part and communicating with the primary flow path and the secondary flow path, wherein the primary flow path opens to the valve chamber through a center of the valve seat, and a chamber side portion of the secondary flow path forms a short cylindrical space and is directly connected to a bottom surface of the valve chamber;
   the valve seat is flexibly deformable and is disposed at an opening of the primary flow path;
   a metal diaphragm having a center portion disposed above the valve chamber, the center portion configured to move in a vertical direction and so as to repeatedly press the valve seat, the metal diaphragm includes an outer edge part, the outer edge part configuring the outer-peripheral seal part;
   a stem disposed above the metal diaphragm and configured so as to be able to freely ascend and descend to cause the center portion of the metal diaphragm to move downward;
   a flow-path restriction part directly connected to the chamber side portion of the secondary flow path; and
   a diameter-enlarged exit flow path directly connected to the flow-path restriction part,
   wherein a first restriction rate is defined as a diameter of the flow-path restriction part divided by a diameter of the chamber side portion of the secondary flow path and is in a range equal to or larger than 0.58 and smaller than 1,
   wherein a diameter of the diameter-enlarged exit flow path is larger than that of the chamber side portion of the secondary flow path,
   wherein a second restriction rate is defined as the diameter of the flow-path restriction part divided by the diameter of the diameter-enlarged exit flow path and is in a range equal to or larger than 0.5 and equal to or smaller than 0.86,
   wherein a crushing amount from a reference height of the valve seat is in a range larger than 0 mm and equal to or smaller than 0.1 mm, and
   thereby providing an effect that the flow-path restriction part is provided so that fluctuations of a Cv value of the valve between a start of use of the valve and after opening and closing fifteen million times while a fluid at high temperatures is flowing are 7% or less.

2. The metal diaphragm valve according to claim 1, further comprising:
   an actuator mounted on the body;
   a spring incorporated into the actuator and configured to cause the stem to descend;
   a piston incorporated into the actuator and configured to ascend in response to a supply of compressed air; and
   an adjustment screw configured to adjust an ascending amount of the piston by screwing the adjustment screw so as to adjust a Cv value of the valve.

\* \* \* \* \*